(12) United States Patent
Hoerentrup et al.

(10) Patent No.: US 9,304,664 B2
(45) Date of Patent: Apr. 5, 2016

(54) METHOD FOR GENERATING MULTI-LANGUAGE MENUS

(71) Applicant: THOMSON LICENSING, Issy de Moulineaux (FR)

(72) Inventors: Jobst Hoerentrup, Wennigsen (DE); Dirk Gandolph, Ronnenberg (DE); Ralf Ostermann, Hannover (DE); Carsten Herpel, Wennigsen (DE); Uwe Janssen, Seelze (DE); Hartmut Peters, Barsinghausen (DE); Andrej Schewzow, Hannover (DE); Marco Winter, Hannover (DE)

(73) Assignee: THOMAS LICENSING, Issy Les-Moulineaux (FR)

( * ) Notice: Subject to any disclaimer, the term of this patent is extended or adjusted under 35 U.S.C. 154(b) by 0 days.

(21) Appl. No.: 14/190,476

(22) Filed: Feb. 26, 2014

(65) Prior Publication Data

US 2014/0181662 A1    Jun. 26, 2014

Related U.S. Application Data

(63) Continuation of application No. 11/791,148, filed as application No. PCT/EP2005/055936 on Nov. 14, 2005, now Pat. No. 8,701,004.

(30) Foreign Application Priority Data

Dec. 2, 2004    (EP) ..................... 04090478

(51) Int. Cl.
*G06F 3/00*  (2006.01)
*G06F 3/0484*  (2013.01)
*G06F 9/44*  (2006.01)
*G06F 3/0482*  (2013.01)
*G06F 3/048*  (2013.01)

(52) U.S. Cl.
CPC ............ *G06F 3/0484* (2013.01); *G06F 3/0482* (2013.01); *G06F 9/4448* (2013.01)

(58) Field of Classification Search
None
See application file for complete search history.

(56) References Cited

U.S. PATENT DOCUMENTS

| | | |
|---|---|---|
| 5,155,849 A | 10/1992 | Westfall et al. |
| 5,416,903 A | 5/1995 | Malcolm |
| 5,434,776 A | 7/1995 | Jain |
| 5,583,761 A | 12/1996 | Chou |
| 5,678,039 A | 10/1997 | Hinks et al. |
| 5,917,484 A | 6/1999 | Mullaney |

(Continued)

FOREIGN PATENT DOCUMENTS

| | | |
|---|---|---|
| EP | 0526035 | 2/1933 |
| EP | 0528640 | 2/1993 |

(Continued)

OTHER PUBLICATIONS

Java, "Java Virtual File System", Jun. 22, 2004, four pages.

(Continued)

*Primary Examiner* — Yongjia Pan
(74) *Attorney, Agent, or Firm* — Robert D. Shedd; Jeffrey M. Navon

(57) ABSTRACT

A method for generating multi-language menus comprises grouping language-dependent menu resource files on a storage medium, and selecting only those menu resource files from a group that are labeled with an indication that matches the preferred menu language of the respective player.

2 Claims, 2 Drawing Sheets

(56) References Cited

U.S. PATENT DOCUMENTS

Figure 1:
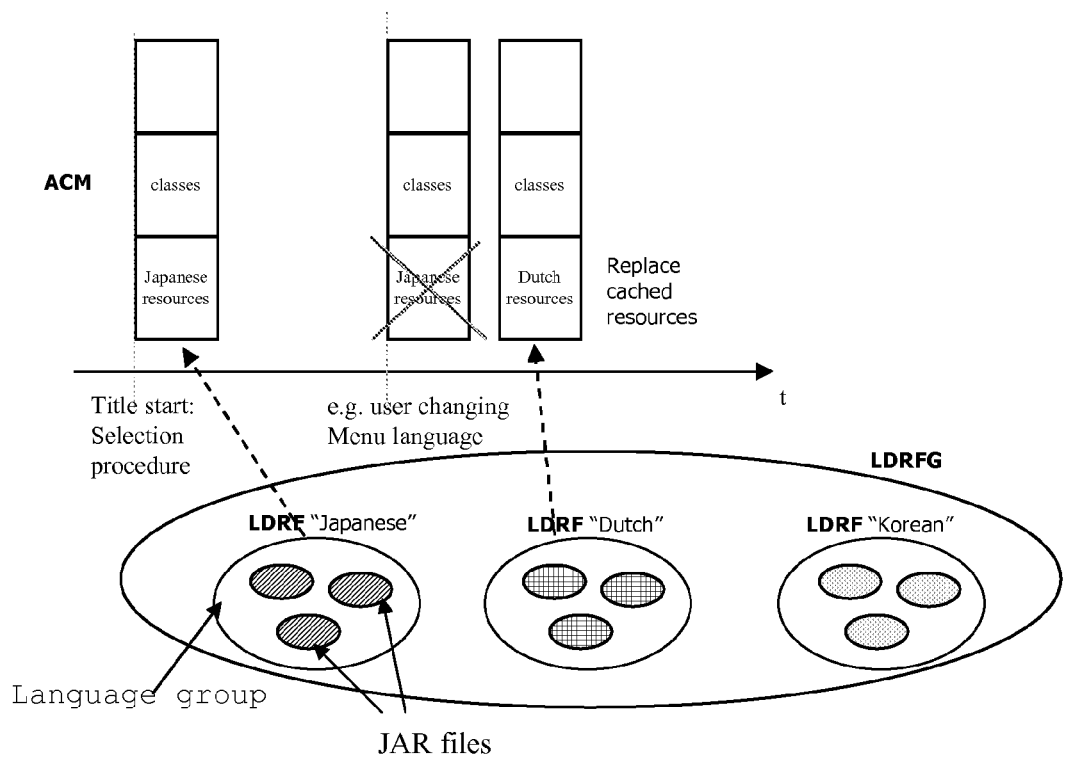

| | | | |
|---|---|---|---|
| 5,996,015 A | 11/1999 | Day et al. | |
| 6,205,418 B1 | 3/2001 | Li et al. | |
| 6,396,515 B1 | 5/2002 | Hetherington et al. | |
| 6,559,861 B1 | 5/2003 | Kennelly et al. | |
| 7,007,026 B2 | 2/2006 | Wilkinson et al. | |
| 7,024,546 B2 | 4/2006 | Real | |
| 7,039,867 B1 | 5/2006 | Scheidig | |
| 7,194,506 B1 | 3/2007 | White et al. | |
| 7,401,187 B2 | 7/2008 | Lange | |
| 7,464,334 B2 | 12/2008 | Miller et al. | |
| 7,711,759 B2 | 5/2010 | Seo et al. | |
| 7,769,920 B2 | 8/2010 | Kimura et al. | |
| 8,660,406 B2* | 2/2014 | Tanaka et al. | 386/247 |
| 2002/0054097 A1 | 5/2002 | Hetherington et al. | |
| 2002/0112226 A1* | 8/2002 | Brodersen et al. | 717/140 |
| 2002/0133523 A1 | 9/2002 | Ambler et al. | |
| 2002/0194337 A1* | 12/2002 | Knight et al. | 709/225 |
| 2003/0049017 A1 | 3/2003 | Chung et al. | |
| 2003/0115186 A1* | 6/2003 | Wilkinson et al. | 707/3 |
| 2003/0179225 A1 | 9/2003 | Nettles et al. | |
| 2004/0136698 A1* | 7/2004 | Mock | 386/123 |
| 2006/0041527 A1* | 2/2006 | Fessler | 707/1 |
| 2006/0143666 A1* | 6/2006 | Okada et al. | 725/89 |
| 2006/0146660 A1 | 7/2006 | Ikeda et al. | |
| 2006/0149910 A1 | 7/2006 | Kim et al. | |

FOREIGN PATENT DOCUMENTS

| | | |
|---|---|---|
| EP | 1396281 | 3/2004 |
| EP | 1407714 | 4/2004 |
| JP | 756789 | 2/1993 |
| JP | 573383 | 3/1993 |
| JP | 2002230891 | 8/2002 |
| JP | 2003153210 | 5/2003 |
| JP | 200497283 | 3/2004 |
| JP | 2004289603 | 10/2004 |
| WO | WO0122245 | 3/2001 |
| WO | WO0135416 | 5/2001 |
| WO | WO2004034395 | 4/2004 |
| WO | WO2004081935 | 9/2004 |

OTHER PUBLICATIONS

Sending by email!, Storing in a FD!, Encyclopedia of Compression and Decompression, PC Work!, Jun. 16, 1999, Japan, Mynavi Corporation, vol. 6 No. 6, p. 57.

Laird, "Server Clinic: Put Virtuai File Systems to Wrok", Apr. 29, 2003, five pages.

White Paper, "Blue-ray Disc Format", Aug. 2004, six pages.

\* cited by examiner

METHOD FOR GENERATING MULTI-LANGUAGE MENUS

This application is a continuation of co-pending U.S. application Ser. No. 11/791,148, filed May 18, 2007, herein incorporated by reference.

Next-generation pre-recorded optical discs will provide for content authors a full-fledged programming environment that allows general network connectivity, download of additional content that supplements the content on the disc, and other features. Such programming environment at the same time imposes very few restrictions on authoring interactive menus as it provides low-level functionality that content authors can use to program all kinds of creative menus. A prominent programmable platform that is suitable and available for consumer electronic devices as well as for PC-like devices is the Java programming platform. When distributed on disc, Java programs are usually packed in a single archive file. Beyond the well-known Java class files, such archive files are able to store arbitrary kinds of other files, such as bitmap and/or sound files.

Next-generation pre-recorded optical discs will also provide a conceptual "application cache memory" (ACM). This is a memory in the player outside the optical disc where such archive files can be copied. This has the advantage that any access to data stored in the ACM does not require a disc seek which might interrupt a running A/v presentation.

A known feature from optical discs is the multi-language menu feature. On such discs, the same menu can be provided in different languages and the player automatically displays the menu that best matches the user preference for menu language. This improves cost-efficiency as the same disc can be sold in multiple countries. Today's systems however require initial loading of the data.

This invention proposes a method that supports such multi-language menu feature for next-generation optical discs by efficient use of the ACM.

An optical disc comprises several titles and a list of contents that is stepped through, partly automatically and partly upon user request. When the disc is inserted in a player and recognized, the player first retrieves initial application data and caches them. The initial application data usually comprises at least data for a top menu, but may also include other application data. The same happens when the user selected one of the titles from the top menu.

From the data structure point of view however, the term "title" means not only the items selectable from the top menu, but also the top menu data and data for a so-called firstPlayback, e.g. an intro. The firstPlayback may be presented initially upon insertion of a disc into the player, without user selection. Each time a "title" is started, the player retrieves application data and caches them. In particular it may be Java program code to be processed by a Java Virtual Machine (JVM), or additional data for such Java program code.

After the firstPlayback is finished, or when the user presses the menu button on his remote, the top menu is displayed, and the player waits for user selection of a menu item. The top menu shows e.g. one or more titles that the user may select. Further sub-menus relating to selectable titles may be loaded later.

Java programs are packed into archive files and stored on the disc. When executed, a Java program can provide the user a graphical interface on the screen. Such graphical user interface is synonymous and an extension to the "disc menus" of optical discs. For a rich user interface it is advantageous to use supplemental (i.e. non-Java code) files, e.g. bitmap files. Such files are commonly called "resources". As described above, resources in multiple languages may be required especially to support the multi-language menu feature. Further, it is assumed that such resources—especially for high-definition (HD) compatible display resolutions—consume a relatively large amount of memory in the ACM.

Each title, including the initial firstPlayback item, may require related data to be retrieved from the disc. These data are usually AV data, but may also be other application data as mentioned before. These data may be archived e.g. in Java Archive (JAR) files on the disc. The retrieved application data are stored in a cache, since they may be used at any time during the AV presentation, and they may be used more than once. An example is menu data for a Java controlled menu. The main purpose of this "caching" is to prevent the pick-up from jumping during the AV presentation just for reading these data, and thus interrupting or disturbing the AV presentation.

Commercially available discs are often made for worldwide distribution, and therefore contain data for different languages, e.g. menu languages. Some of them are title related, others disc related. The individual user however needs usually only one or two of these languages. Within this patent application, the files that are used for the same purpose or application, but for different languages, are called a group, and a group is identified by a group type. Various group types can be defined for various technical applications, e.g. menu languages, subtitle languages, or country specific data.

The drawings show in

Figure 2:
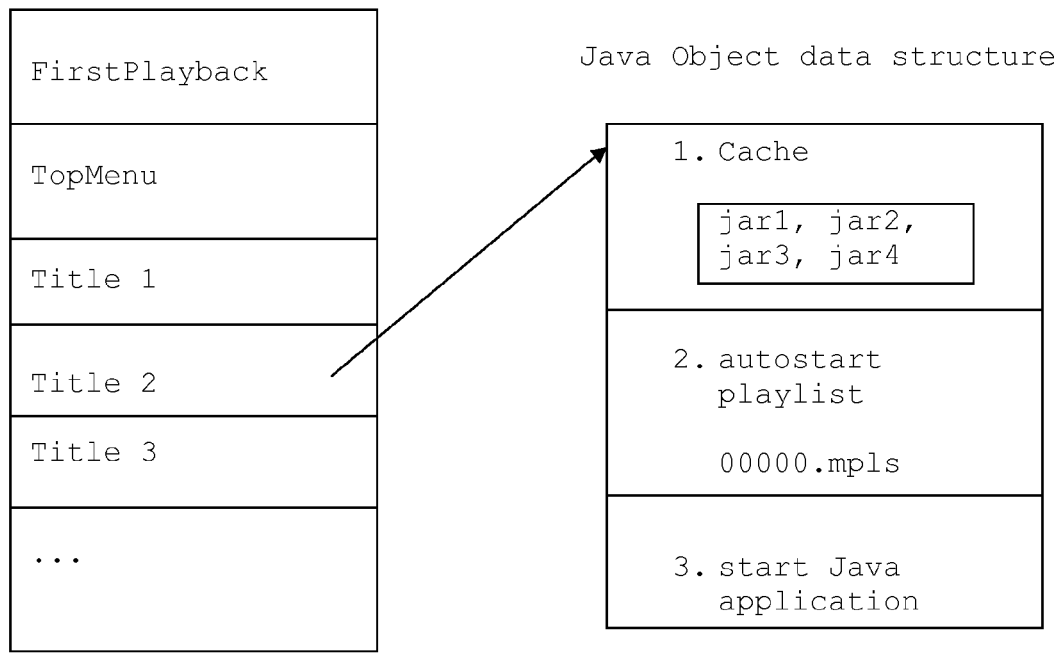
Figure 3:
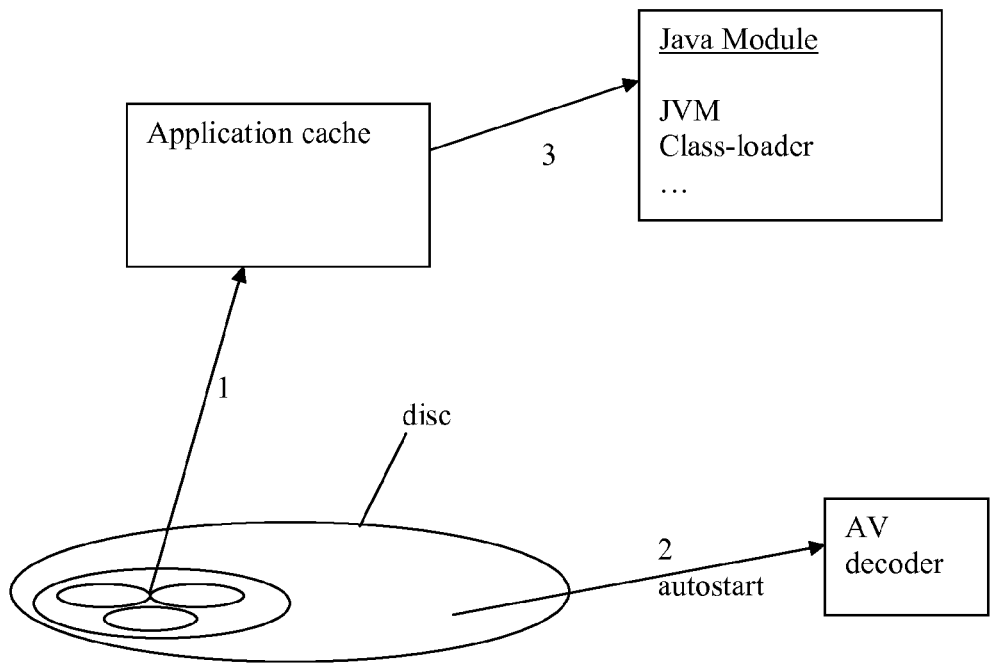

FIG. 1 usage of an application cache memory (ACM) for changing language-dependent data files;

FIG. 2 title structure on disc and object data structure of single title;

FIG. 3 steps performed by player; and

Figure 4:
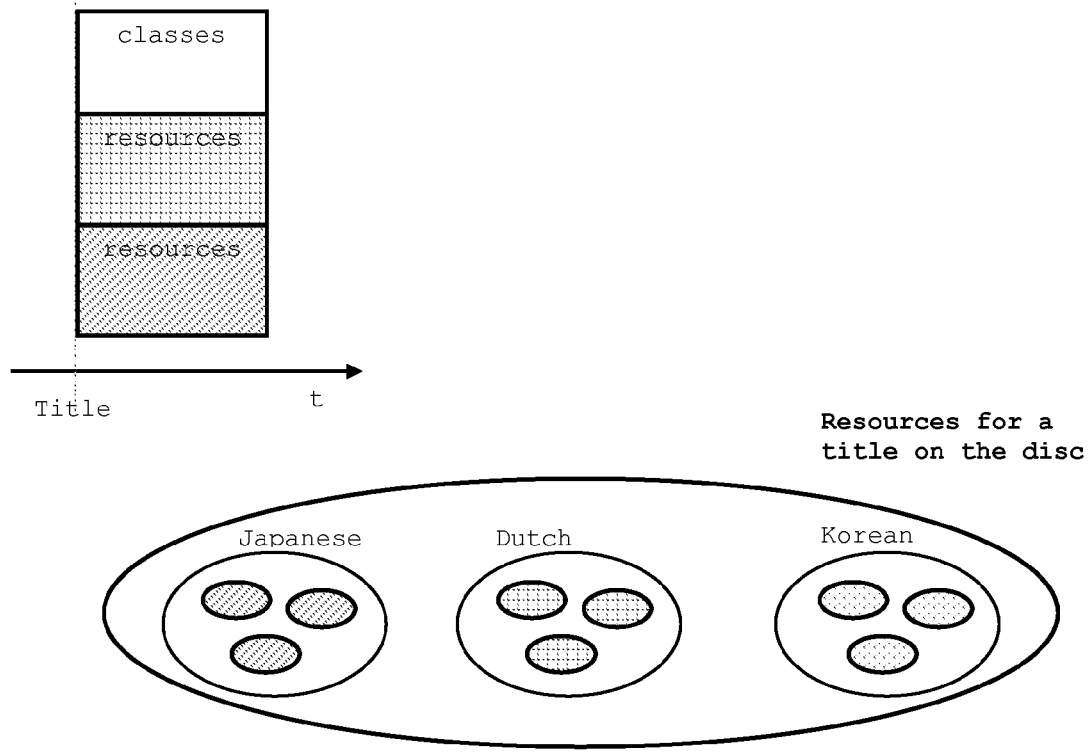

FIG. 4 shortcomings of state-of-the-art caching models.

It is possible to define for any title an "autostart" feature with an autostart playlist, meaning that the player, and not the user or an application, starts a playback automatically. The autostart feature is however different from the firstPlayback which is the particular title that is played back only once, namely immediately after insertion of the disc, and not selectable from any menu. An autostart playlist may be activated when the user has selected a title from a menu that requires further processing, e.g. unpacking and/or compiling data from a JAR file. Thus, the resulting pause can be skipped, and filled with entertainment. This has the advantage that the user can enjoy a video and/or audio presentation while the player prepares data required for the actually selected title, instead of watching a dark screen.

Since the respective data for menus are voluminous, it would be desirable to cache only the data for those languages that are required. Particularly for menus it is very probable that for one particular player only one language is used, other than e.g. for audio or subtitle languages where the user might want to switch to another language e.g. for training that language.

Players may have an internal register that defines their preferred menu language. Other internal registers may specify a subtitle language preference. The user may modify these preferences according to his needs. According to the invention, the preferred menu language register can be used to retrieve and cache only those menu data that correspond to the preferred language. For this purpose, it is an aspect of the invention to mark the respective data, in particular JAR files, with a language code, e.g. in the form of metadata. When the user modifies the preferred menu language, the inventive player automatically detects which of the cached data has a language code, determines the group type of such data, and replaces in the cache such data with other data of the same group type but a language code matching the new preferred menu language. If the player has different modes, then this function may only be necessary in a particular mode, e.g. Java mode.

Further, common discs have several titles, with each title having its own set of language-specific data. Retrieval of all these data upon title selection however requires a considerable load time before the actually selected title may start. This time can be bridged e.g. by presenting the autostart playlist, as described before. Further, the cache memory in the player needs to be large to hold all these data. It would therefore be desirable to cache upon title start only those data that relate to the currently selected title and match the currently selected language. Upon start of a selected title, there is always a caching phase. Thus, an intelligent caching algorithm is required, and provided by the invention.

From a technical point of view, a disc contains a number of titles, including firstPlayback and top menu. The user however cannot directly select the firstPlayback, and it is only used once, directly after disc insertion. For using the top menu, the user can usually press a "menu" button on the remote controller. The other titles may usually be selected via the remote from the top menu with cursor keys, or numerically.

For each "title" there may be a caching-phase (step 1) for storing title-related data like JAR files in the ACM. Thereafter an autostart playlist may optionally be started (step 2), and then one or more applications start (step 3); the term "autostart playlist" means that playback of the playlist is not triggered by an application, like playlists used in step 3, but automatically by the player, without application interference. In principle, triggering an application in step 3 is sufficient to start a presentation, but due to caching and pre-processing it may take long until the application has all its data ready and can start-up. Therefore the player provides in step 2 some user entertainment, to bridge this time. One advantage of the invention is that this time can be shortened because the JAR files corresponding to the preferred language are automatically detected, and only these need to be loaded. When then the top menu is displayed, it may be overlaid to the autostart playlist.

The same problem occurs however when the user selects another language during an AV presentation. Such selection may be done while the top menu is displayed. Normally also the player provides a menu for this purpose. As a consequence, the player needs means to selectively flush and reload its ACM.

The user may invoke the top menu at any time, also during the AV presentation. The top menu itself may be based on a Java application. But then the caching phase of the currently active title (the top menu) is over. The pick-up has to jump when data for a different language shall be loaded, so that the running presentation of either the intro or a selected title is shortly interrupted. Advantageously, the player may automatically detect which of the cached data has an associated language code and what the group type of such cached data is, and replace it with data of the same group type and different language code. It may therefore have space in the ACM reserved that is sufficient for each file of the respective group type. E.g. when a particular title is loaded, the player detects that menu resource files have a certain group type value, e.g. 0xA, that the JAR files of this group have language labels for Japanese, Dutch and Korean, and sizes of 100 kB, 120 kB and 99 kB. Thus, the player may automatically detect that the largest of these resource files has 120 kB, and reserve 120 kB in the ACM section for group type 0xA. Further, the player may store for which languages resource files of this group type are available for the current title and where they can be found on the disc, so that it is easy to find them if the preferred menu language is changed.

Advantageously, the invention allows the user to switch the language preference for menus at any time, without having to restart the whole title, and with only minimized user disturbance.

According to one aspect of the invention, the application files that relate to the same language and are on the same disc are grouped by means of a language label, and/or the data structure. Then, upon selection of a particular language, only the files that correspond to the selected language may be retrieved and cached automatically.

According to one aspect of the invention, a plurality of alternatively usable archive files with language labels is defined as a group. Only those files of a group that have a particular language label are loaded and cached at a time. The player may however store the information which other files belong to the group, which language label they have and their size and location on the disc.

According to another aspect of the invention, the player has in addition to a preferred language also a second default language defined, which is used when a disc contains no files labelled with the preferred language. E.g. when the preferred language is Chinese, and a disc contains only data labelled as French, English and Spanish, then the second default language may be used, e.g. English. Alternatively, a default rule may be defined saying that the first found file from a group is cached in that case.

The invention can be used for Java application data or similar structures with time-consuming data retrieval, caching and/or pre-processing (e.g. decompression), where due to restricted memory and/or reduced load-time only one (or few) of a group of application data files shall be loaded. Such Java application data can be e.g. menus, menu buttons, interactive portions of a video, games etc. The JVM may run continuously during the presentation of the respective title, either in the background or visible.

The following is an example for Java application data retrieved from a disc. In a first step, a Java archive (JAR) file comprising a plurality of files that may be compressed is read from a disc and stored in a cache. These files include e.g. execution code for a JVM, or bitmap data for menu pages in a particular language to be rendered through a JVM. The advantage of using bitmap data is that it is independent from particular character sets. The first step includes looking up in a player register the preferred language, comparing the preferred language with the language label of the JAR files on the disc, and reading that JAR file or files that have a language label corresponding to the preferred language. In one embodiment, all JAR files with the corresponding language label are read, regardless of their group type indication. In another embodiment, all JAR files with the corresponding language label and relating to a selected title are read. In yet another embodiment, only a JAR file that is labelled with a particular group type and with the corresponding language label is read for each application. The invention has the advantage that the data load phase is shorter than for conventional players that load all available data. Further, less cache memory is required.

In a second step, a first AV presentation defined as first-Playback or autostart Playlist is started automatically, without user activity. From the start of this first AV presentation on, the pick-up is busy with retrieving AV data. While the first AV presentation is running, the player prepares the cached data to be used by the JVM. In a conventional case, the cache may be full with menu data of several languages, and some may even be missing because the cache was full. E.g. in the situation shown in FIG. 4 there is no space left in the ACM to load resources for the Korean language. In a player according to the invention, which includes selection means for selecting particular data and comparing means for comparing the language label of data and the preferred language, the cache contains e.g. top menu data only for the preferred language. When the data are ready, e.g. decompressed or compiled for JVM, the firstPlayback presentation may be superposed with the top menu in the language defined as preference by the player.

For this purpose, execution of a Java application on the JVM starts in a third step, wherein the cached data are used. This may be e.g. Java class library files that are required by a class-loader. Also the top menu itself may be a Java application. When the user selects a title from the top menu, the pick-up of a conventional player would jump to the beginning of the AV stream data and start retrieving the stream. In a player according to the invention however the pick-up jumps first to the position where the JAR file(s) relating to the selected title and the selected language are stored, retrieves these JAR file(s) for caching, wherein previously cached data need not necessarily be overwritten, then (optionally) jumps to the autostart Playlist AV stream and presents this stream while preparing/loading data for JVM, and only then jumps to the beginning of the actual AV stream data. This may take a short time. But since the amount of data is very limited, reproduction of the selected title will very soon begin.

User-interfaces for optical discs titles may be generated through Java. A title here means the subdivision of a disc into distinct parts that are user recognizable. Commonly a title is assigned a numerical identifier that a user can select to switch to the title. But also the part that is automatically launched when the disc is inserted into the player (firstPlayback), as well as the top menu that is commonly selectable through a "Menu" button on the remote control, are called "titles" in this context.

For advanced applications on future optical discs that support a user interface in multiple languages, this invention comprises the following.

All elements of an application that are language dependent and that belong to a common language are stored on the disc in a separate language dependent archive file (LDAF), or language dependent resource file (LDRF) respectively. Each such LDAF has a language attribute assigned, e.g. a metadata tag. Each such LDAF is part of a language dependent archive file group (LDAFG), or language dependent resource file group (LDRFG) respectively. An LDAFG may be defined through a data structure stored on the disc that references all LDAFs that belong to the LDAFG. Only one LDAF of a LDAFG can be stored in the ACM at a time. The player automatically selects one LDAF out of the LDAFG to be transferred to the ACM by comparing the language attribute of the LDAFs in a LDAFG with the user preferences that is valid for the menu language.

A default LDAF may be defined for the case that the LDAFG does not contain an LDAF that matches the user language preferences for menus.

At title-start, the player may reserve in the ACM memory space that is sufficient for holding the largest LDAF out of the LDAFG. If the transfer of the LDAF to the ACM happens at title-start, the transfer happens before launching any application and before starting any A/V playback. The LDAF that is stored in the ACM is replaceable during the title lifetime with any LDAF out of the same LDAFG.

All LDAFs of a LDAFG are assigned the same caching priority.

Advantages of the invention are the following:
speed-up of title start because only one LDAF/LDRF is cached.
efficient use of ACM because only one LDAF/LDRF out of a LDAFG/LDRFG is needed at a time and only the LDAF/LDRF that is currently needed is stored in the ACM.

The data structure shown in Tab.1 provides information, which files are subject to transfer from a Virtual File System that is built after disc insertion or title selection into the application cache memory. All JAR files that are referred to in the ApplicationManagementTable( ) of the parent object are listed.

group_type is a 4-bit field that specifies the type of the group. When group_type is e.g 0x1, this indicates a language dependent group. The player shall only cache a single file from the group according the following selection procedure: The player shall try to cache that file from the group whose language_code matches the players menu language preference stored in the respective player status register (PSR). If no match can be found, the player may try to cache the first file in the group. Group_type 0x2 may indicate a language independent group. The player shall sequentially try to cache the files in the group, starting with the first one in the group.

TABLE 1

Application cache info data structure

| Syntax | No. of bits | Mnemonic |
|---|---|---|
| AppCacheInfo( ) { | | |
|   length | 32 | uimsbf |
|   number_of_groups | 16 | uimsbf |
|   for (i=0; i<number_of_groups; i++) { | | |
|     Group_type | 4 | uimsbf |
|     reserved_for_future_use | 12 | bslbf |
|     number_of_files | 16 | uimsbf |
|     if (group_type == 0x1) { | | |
|       for (i=0; i<number_of_files; i++) { | | |
|         file_name | 8 * 10 | bslbf |
|         language_code | 8 * 3 | bslbf |
|         reserved_for_future_use | 8 | bslbf |
|       } | | |
|     } | | |
|     else if (group_type == 0x2) { | | |
|       for (i=0; i<number_of_files; i++) { | | |
|         file_name | 8 * 10 | bslbf |
|       } | | |
|     } | | |
|   } | | |
| } | | |

The number_of_files field indicates the number of files that are part of the current group. The file_name field indicates the file name of a "JAR" file. The file name may e.g. be coded according to ISO 646. The language_code field specifies a language code of the JAR file. The language codes can be according to international standard, e.g. ISO 639-2. Each code represents a name of a language by three-characters, and may be coded according to ISO 646.

The invention can e.g. be used for multi-language support for BD-J. It comprises a caching model refinement.

HD movie mode (HDMV) supports menus in different languages.

For storage, there is basically one Interactive Graphic (IG) stream per menu and language.

Regarding the language, the IG stream provides the language identifier. They are stored in the associated clpi-file.

An automatic selection procedure for the player is defined.

The user can switch the menu language preference at any time.

According to the invention, the multi-language feature shall also be efficiently supported in BD-J. An advantage is that user-confusion is avoided. This requires improvements to the current caching framework, as outlined in the following.

The following assumptions are taken: memory consumption of resources is potentially high, e.g. for HD-compatible bitmaps, sounds etc. Therefore it is worthwhile to handle these efficiently with respect to caching.

Shortcomings of the current model are that the application cache is fixed during title lifecycle, i.e. cannot be reloaded, and therefore may be used inefficiently. Maybe it cannot cache the resources completely. The application will only need resources for one specific language at a time. Since the cache is fixed during the title, this requires at least one disc seek for each access to a single non-cached resource file. This means heavily interrupting video playback.

This is depicted in FIG. 4. When the player has loaded menu resources e.g. for Japanese and Dutch into its application cache memory (ACM), because e.g. these were the first it found on the disc, and the user selects Korean language, then the pick-up has to get this resource from the disc, without being able to cache it in its static ACM. On the other hand, it may not simply flush its ACM because it contains also e.g. library class files, which are continuously needed. Therefore, it is advantageous to flush parts of the ACM selectively.

The invention proposes to add a mechanism for language-dependent caching at title start. This is needed to support seamless playback of "autostart" playlists, as described above. Media playback should not be interrupted for loading a language specific JAR file into the ACM. Further, according to the invention a cached language resource is replaceable during the title. Thus, only a single disc seek/access is needed upon language change.

FIG. 1 shows the replacement of language resources in the ACM according to the invention. Upon title start, resources for a first language (Japanese) are loaded, and the class library files required by the JVM. The first language is determined using the preferred menu language register of the player. As indicated, the ACM contains resources for only one language, and thus is not full. After title start, the user changes the required menu language, e.g. to Dutch. Now the player determines with an appropriate means which part of the ACM holds the resources for Japanese, deletes these resources and loads resources for Dutch from the disc, thus replacing the Japanese resources.

On the disc, resources for one language may be distributed to a plurality of files, e.g. JAR files. This is shown e.g. in FIG. 1. Thus, only one archive file per language is necessary for a particular purpose, so that it is easy to find and load when another menu language is selected.

A group of JAR files is defined in the caching information list of the Java object, shown in FIG. 2. This JAR files group is a set of JAR files, where each JAR file in the group is assigned a language attribute. This can be e.g. an ISO 639 3-letter language code.

As compared with state-of-the-art caches, the invention comprises a refined caching model. Upon title selection, the player caches one JAR file out of the group, namely the one that matches the user preference for menu language stored in a particular PSR. A default may be defined for the case that the menu language preference does not match any in the group. An additional mechanism allows to cache/uncache JAR files during title lifecycle.

Advantageously, the selective caching prevents the cache/uncache mechanism from interrupting playback of the autostart playlist at title start.

The basic sequence at title start is the following: The player caches JAR files as indicated in a list within the Java object (Tab.1). Thereby, it includes language-dependent JAR files. Then an autostart playlist is launched, if provided. Then the actual application(s) is/are launched. The application can now access language-dependent resources from the cache without interrupting playback of autostart playlist.

One aspect of the invention is defining a language group in the Java object, refining the caching model at title start as described, and an additional mechanism that allows caching and uncaching resource files during title lifecycle. Among others, following further options are possible: Either the mechanism can be player controlled, so that the replacement of cached resources is done upon user operation of language change. Or it may be application controlled, e.g. through an application programming interface (API) or classloader-triggered, i.e. each file is cached that is loaded from the disc.

The invention can be used in playback devices for media that support multi-language menus, where language dependent data are read from the medium. The invention is particularly advantageous if a part of these data requires time-consuming further processing, to prevent the user from having to wait unnecessarily long.

The invention claimed is:

1. Method for executing in a player device a software application relating to an audio-visual presentation, wherein the audio-visual presentation is one of a plurality of titles stored on a first storage medium, the method comprising detecting a title selection request, and in response to the title selection request generating or updating a virtual file system according to the selected title;

reading, within the virtual file system, data from the first storage medium, the data comprising audio-visual presentation data and software application data, the software application data having a language label associated;

comparing the language label associated to the read software application data with a preferred language identifier;

selecting, within said virtual file system, software application data that are associated with a language label matching the preferred language identifier;

caching the selected software application data that are associated with a language label matching the preferred language identifier in a cache memory within the player device;

generating a first audio-visual presentation based on said audio-visual presentation data, wherein the first audio-visual presentation starts automatically;

during the first audio-visual presentation performing at least one of processing, decompressing, unpacking and compiling the cached software application data and upon termination of said at least one of processing, decompressing, unpacking and compiling the cached software application data, performing terminating said first audio-visual presentation;

generating a second audio-visual presentation from said audio-visual presentation data readable from the first storage medium; and executing a software application based on the cached data while generating said second audio-visual presentation, wherein the software application is distinct from the audio-visual presentation and the software application modifies the audio-visual presentation.

2. A Non-transitory storage medium having stored thereon a software application relating to an audio-visual presentation,
wherein the audio-visual presentation is one of a plurality of titles stored on a first storage medium, the software application having instructions that allow a playback device to perform
detecting a title selection request, and in response to the title selection request
generating or updating a virtual file system according to the selected title;
reading, within the virtual file system, data from the first storage medium, the data comprising audio-visual presentation data and software application data,
the software application data having a language label associated;
comparing the language label associated to the read software application data with a preferred language identifier;
selecting, within said virtual file system, software application data that are associated with a language label matching the preferred language identifier;
caching the selected software application data that are associated with a language label matching the preferred language identifier in a cache memory within the player device;
generating a first audio-visual presentation based on said audio-visual presentation data, wherein the first audio-visual presentation starts automatically;
during the first audio-visual presentation performing at least one of processing, decompressing, unpacking and compiling the cached software application data and
upon termination of said at least one of processing, decompressing, unpacking and compiling the cached software application data, performing
terminating said first audio-visual presentation;
generating a second audio-visual presentation from said audio-visual presentation data; and
executing a software application based on the cached data while generating said second audio-visual presentation, wherein the software application is distinct from the audio-visual presentation and the software application modifies the audio-visual presentation.

* * * * *